Dec. 27, 1938.   H. ERNST ET AL   2,142,022
INFEED CYCLE CONTROL ATTACHMENT
Filed March 21, 1938   3 Sheets-Sheet 1

INVENTOR.
HANS ERNST
RAYMOND D. WORTENDYKE
BY Parsons
ATTORNEY.

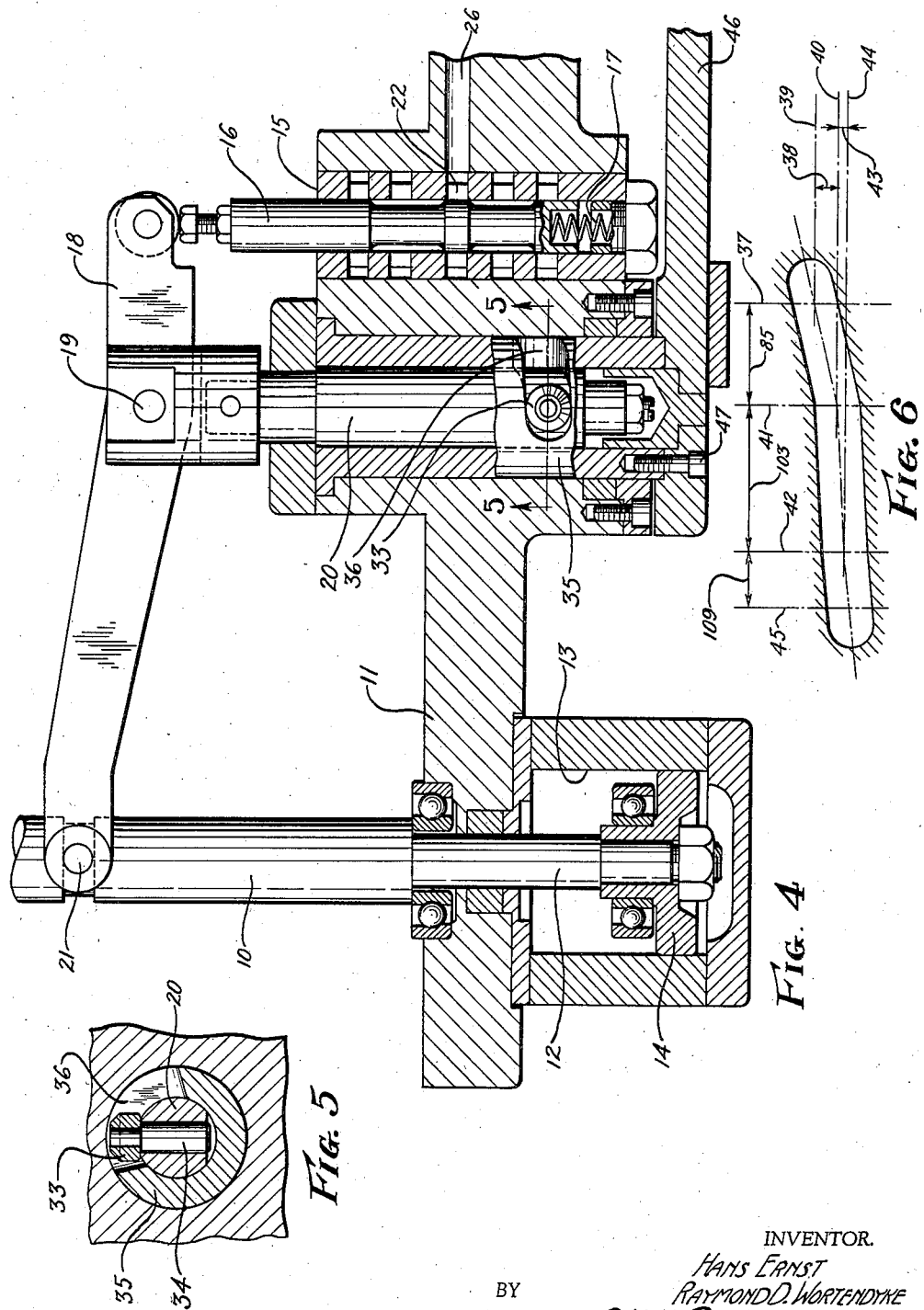

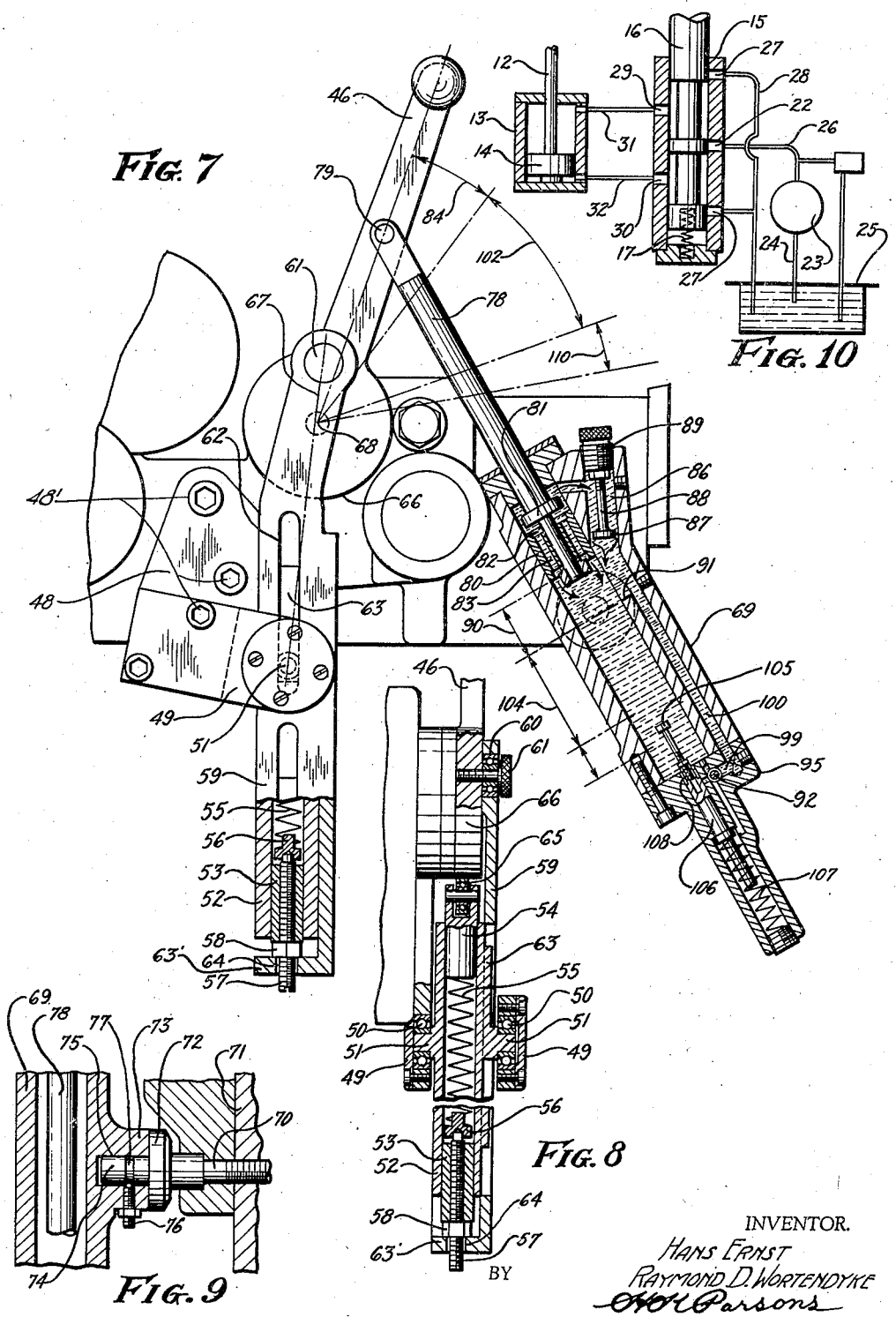

Patented Dec. 27, 1938

2,142,022

UNITED STATES PATENT OFFICE 2,142,022

INFEED CYCLE CONTROL ATTACHMENT

Hans Ernst and Raymond D. Wortendyke, Cincinnati, Ohio, assignors to Cincinnati Grinders Incorporated, Cincinnati, Ohio, a corporation of Ohio Application March 21, 1938, Serial No. 197,154

15 Claims. (Cl. 51—95)

This invention relates to machine tools and more particularly to a semi-automatic cyclic control attachment therefor.

One of the objects of this invention is to provide an improved attachment for a machine of the character shown in U. S. Patent 2,101,644 which will automatically effect the approach cycle between the grinding wheel and the work.

Another object of this invention is to provide an attachment which is applicable to a manually operable cycle control lever of a machine tool for power moving the same through the operative part of a cycle at prescribed rates.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 4 is an enlarged detail section on the line 4—4 of Figure 1.

Figure 5 is a detail section on the line 5—5 of Figure 4.

Figure 6 is an expanded view of the cam path on the cam member in Figure 4.

Figure 7 is an elevational view similar to that shown in Figure 1, but with the parts illustrated in starting position.

Figure 8 is a section on the line 8—8 of Figure 1.

Figure 9 is a section on the line 9—9 of Figure 1.

Figure 10 is a diagrammatic view of the hydraulic control circuit.

Figure 1:
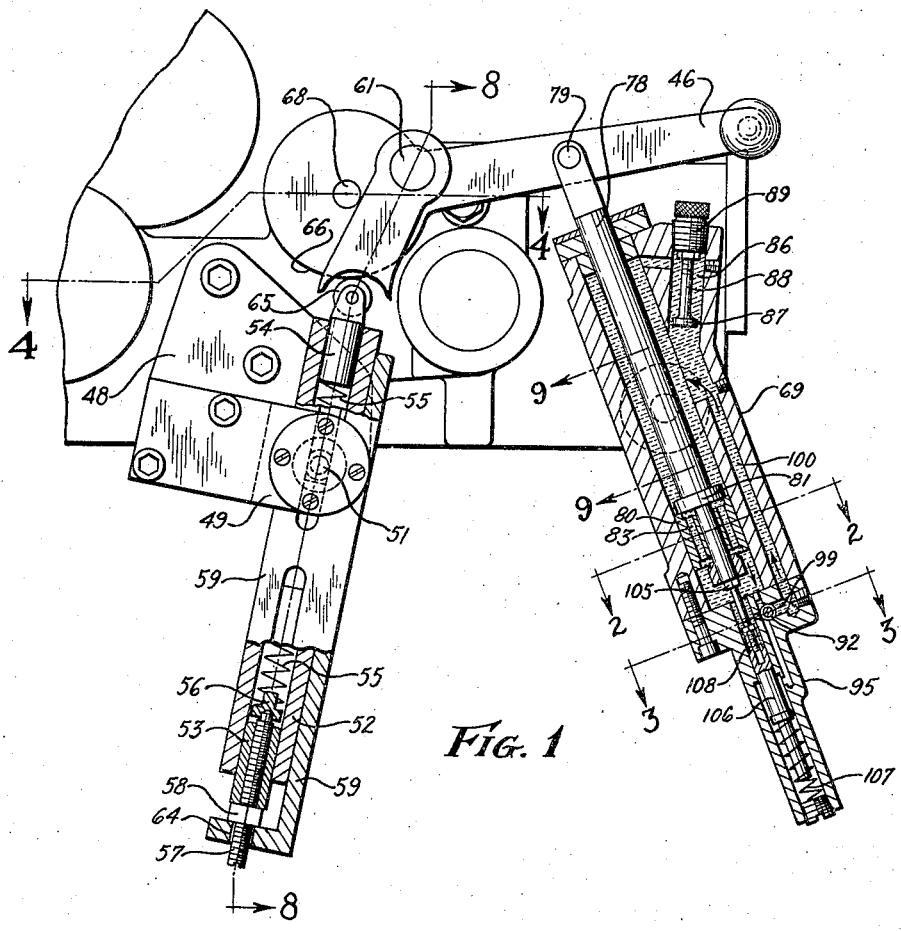
Figure 1 is a front view partly in section of the mechanism embodying the principles of this invention.

Referring to Figure 4 of the drawings, the reference numeral 10 indicates an actuator for a movable part of a machine tool, as, for example, the saddle of a grinding machine similar to that shown in U. S. Patent 2,101,644. The actuator 10 is supported in a frame 11 and is provided with an extension 12 in the form of a piston rod which projects into a cylinder 13 for connection to a piston 14 contained in the cylinder. It will be obvious that if fluid pressure is admitted to one side or the other of the piston, that relative movement will take place between the actuator 10 and the frame 11.

A servo-valve control mechanism governs the admittance of fluid pressure to the cylinder. The servo-valve, which is indicated generally by the reference numeral 15, has a reciprocable plunger 16 that is urged in one direction by a spring 17, and positively moved in the opposite direction by a lever 18. The lever 18 is pivotally connected at 19 to an actuating plunger 20, and by means of a pin 21 located in the end of the lever, to the actuator 10. It should now be evident that if the actuator 10 is stationary and the plunger 20 is moved axially, that the lever 18 will pivot about the pin 21, and thereby cause movement of the servo-valve plunger 16.

The servo-valve has a pressure port 22, connected to the output of a suitable source of pressure, symbolized in the present instance by a pump 23, Figure 10, having an intake 24 through which fluid is withdrawn from a reservoir 25, and a delivery pipe 26 through which fluid is delivered to the port 22. The valve also has a pair of exhaust ports 27 which are connected to a return channel 28. In addition, the valve has a second pair of ports 29 and 30 which are connected by channels 31 and 32 respectively to opposite ends of the cylinder. If the valve plunger 16 is moved upward, as viewed in Figure 10, the pressure port 22 is connected to the port 30, and the port 29 is connected to the exhaust port 27 whereby relative movement will take place between the piston 14 and the cylinder 13 in one direction; while if the valve plunger 16 is moved downward, the pressure port 22 will be connected to the motor port 29, and the remaining motor port 30 will be connected to the exhaust port 27, and relative movement will take place between the parts in an opposite direction.

The plunger 20 is moved by means of a cam mechanism comprising a follower 33 which, as shown in Figure 5, is attached to the end of a stud 34 fixed in the plunger; and a rotatable sleeve 35, which has a groove 36 for receiving the follower 33. This groove is shown rolled out in Figure 6. The axis 37 indicates the starting position and as the cam is rotated clockwise or, in other words, moved toward the right, as viewed in Figure 6, the angle of the cam path is such as to effect a rapid traverse movement of the follower 33, the amount of this movement being indicated by the distance 38 between axes 39 and 40. At the axis 41, the angle of the cam path decreases so that during movement from axis 41 to axis 42, the cam follower will only move the distance 43 indicated between the axis 40 and the axis 44.

When the sleeve has rotated to align the follower on the axis 42, sufficient relative movement has taken place to bring the piston into contact with the end of the cylinder. It will therefore be evident that any further movement of the cam will simply open the servo-valve ports wider without any resultant follow-up movement, whereby the pressure will rise in the cylinder. This is done in order to solidly hold the parts in a final position during the time that the grinding wheel is cleaning up the work and sparking out. This is accomplished by extending the cam groove to the axis 45 and increasing the angle of the slope of the cam to cause further opening of the port.

It is the usual practice to rotate the sleeve 35 by means of a hand lever 46 which is attached to the end of the sleeve as by clamping screws 47. This invention deals with a mechanism whereby after the handle is moved a slight amount to initiate the movement, the mechanism will rotate the handle automatically through a complete infeed stroke.

The mechanism comprises a bracket 48, Figure 1, which is detachably secured to the front of the machine by screws 48', and has a bifurcated portion 49 in which is mounted antifriction bearings 50, Figure 8, for receiving pintle portions 51 of an oscillatable member 52. This member is in the form of a tube having a plunger 53 reciprocably mounted in the lower end thereof, and a second plunger 54 reciprocably mounted in the upper end thereof. A compression spring 55 is interposed between the two plungers, the lower end of the spring engaging an adjustable abutment member 56 riding on the end of a screw 57 threaded in the plunger 53. By rotating the screw, the compression of the spring 55 may be varied without changing the position of the plunger 53. A lock nut 58 is threaded on the screw 57 for locking the same against movement with respect to the plunger.

A link and spring body member 59 has one end attached, through an antifriction bearing 60 and a removable pin 61, to lever 46. The lower portion of the link member 59 is in the form of an angle iron which engages two sides of the member 52. One side of the link also has an elongated slot 62 formed therein which is guided on an elongated projecting portion 63 of the member 52 whereby the two parts will swing together about the pintles 51. The lower end of the link 59 is boxed to form the wall 63' which engages the lower end of the plunger 53, and has a hole 64 formed therein through which the screw 57 may pass.

The upper end of the plunger 54 has an antifriction roller 65 pivotally mounted therein for engaging the periphery 66 of the hub of the operating handle 46. It will be noted that the compression spring 55 continuously urges the parts 54 and 53 apart whereby the link is urged downward, and the plunger 54 upward into contact with the opposite side of the hub thus counterbalancing the forces acting on the lever which prevents binding.

It will be noted from Figure 7 that a line 67 running through the center of the pin 61 and the center of the pintle 51 passes by the center of rotation of the lever 46 slightly on the left hand side, and the spring 55 acting downward on this line will tend to hold the lever 46 in the position shown whereby the effect of a toggle mechanism is obtained.

When the lever 46 is rotated in a clockwise direction sufficient to cause the line 67 to pass to the other side of the axis 68, the lever 46 would immediately be moved in a clockwise direction at a rapid rate by the spring 55. It is, of course, desirable that this movement take place at some prescribed slow rate in order to provide sufficient time for the grinding wheel to do its work. Therefore, an adjustable dash pot mechanism has been provided so that variable rates of rotation of the lever may be obtained.

To this end, a dash pot cylinder 69 is pivotally supported on the front of the machine, as more particularly shown in Figure 9. This mechanism comprises a stud 70 which is threaded in the frame 71 of the machine, and has a flange 72 against which abuts a boss 73 formed on the cylinder 69. The stud 70 has an extension 74 which fits in a bore 75 formed in the boss 73 and the parts are held together by a set screw 76 which has a reduced end fitting a groove 77 formed in the extension 74. By means of this construction the cylinder may oscillate about the axis of the stud.

A piston rod 78 is pivotally connected by a removable pin 79 to the control lever 46, and a piston member 80 is mounted on the opposite end of the piston rod but capable of a certain amount of lost motion with respect to the rod. The rod has an enlarged flange 81 which is adapted to fit in a countersink 82 formed in the end of the piston which thereby closes one end of a plurality of perforations 83 which extend longitudinally of the piston. The cylinder 69 is filled with fluid, and therefore when the operator moves the lever 46 in a clockwise direction, the piston rod 78 takes up the lost motion between it and the piston and in so doing closes one end of the perforations so that as the piston moves, it applies pressure on the fluid ahead of it.

Since the cylinder 69 is a closed chamber, it will be apparent that in order for the piston to move, some of the fluid ahead of the piston must be by-passed in some manner to the other side of the piston. It should also be evident that the rate at which the fluid is by-passed will determine the rate of movement of the piston.

During movement of the lever 46 through the angle 84, which corresponds to the distance 85 between axes 37 and 41 of the cam, as shown in Figure 6, the fluid ahead of the piston is by-passed through a passage 86 to the other side of the piston. In this passage is a piston 87 which is smaller in diameter than the passage 86 so as to permit fluid to pass by it while still offering sufficient resistance to regulate the movement. The piston is supported by a rod 88, which is threaded in the end of a cap member 89. This cap member can be removed to permit replenishment of fluid in the reservoir. When the piston 80 has moved through a distance indicated by the reference numeral 90, and which corresponds to the angle 84, the piston closes the connection to the passage 86 through the opening 91, so that the fluid ahead of the piston must now be forced through a check valve located in the lower end of the cylinder and indicated generally by the reference numeral 92.

Figures 2, 3:
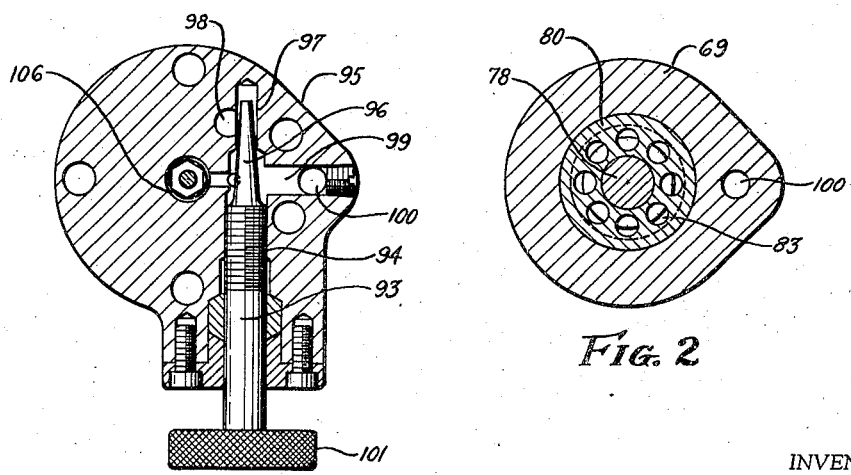
Figure 2 is a detail section on the line 2—2 of Figure 1.
Figure 3 is an enlarged detail section on the line 3—3 of Figure 1.

The details of this check valve are more particularly shown in Figure 3, and the valve comprises a rotatable plunger 93 which is threaded at 94 in the housing 95. The end of the plunger has a reduced tapered portion 96 for variably closing the end of a co-axially aligned bore 97. This bore communicates with a second bore 98 which terminates in the lower end of the cylinder. The fluid flows from the bore 97 past the resistance offered by the tapered valve member 96 into a cross passage 99 which communicates with a vertical passage 100 that terminates in passage 86. The plunger 93 is provided with a knurled operating knob 101, so that by rotating the knob, the amount of hydraulic resistance created by the tapered portion 96 may be varied. Since a very high resistance may be set up, the rate of movement of the control lever may be made very slow if so desired.

In order to move the lever 46 through the angle indicated by the reference numeral 102, which corresponds to the distance 103 on the control cam, the piston must move through the distance indicated by the reference numeral 104 in Figure 7. At this point the end of member 78 will contact the end 105 of a spring plunger 106. The plunger 106 is normally held in a closed position by a spring 107 interposed between the end of the plunger and the end of the housing and when it is depressed, a reduced portion 108 on plunger 106 interconnects the end of the cylinder with an extension of cross passage 99. This forms a by-pass connection around the adjustable throttle valve whereby the fluid may transfer at a more rapid rate thereby accelerating the movement of the lever. This accelerated movement corresponds to the length of movement 109 on the control cam and to the angle 110 of the control lever.

The sequence of operation is thus as follows. The continuous urge of the spring 55 causes the lever 46 to move in a clockwise direction while the dash pot mechanism controls the rate of this movement, there being a first by-pass connection permitting a rapid movement, a throttle valve connection permitting a very slow movement, and then a by-pass connection around the throttle valve permitting a second rapid movement which establishes the necessary pressure in the cylinder 13 to hold the parts in a locked position while the grinding wheel is finishing the work to size. The operator then returns the parts to a starting position by moving the lever 46 in a counterclockwise direction which thereby causes the piston rod to move relative to the piston, opening the perforations in the piston so that the fluid in the top of the cylinder may flow through the perforations at a rapid rate and thus be transferred from one side to the other of the piston without perceptibly hindering the movement of the lever by the operator. After the lever has been moved past the center position, the toggle action holds the parts in a starting position until the next cycle begins.

There has thus been provided an improved attachment for actuating a manual control lever of a machine tool automatically, at variable prescribed rates in accordance with a desired cycle.

What is claimed is:

1. In a machine tool having a manually operable control lever movable in one direction to effect a relative feeding movement between cooperating parts of the machine, the combination of resiliently operable means connected to said lever for actuation thereof, a toggle connection between said lever and resiliently operable means for determining the reaction effect of the means on the lever, said lever being manually movable to shift said toggle connection and release said resiliently operable means for automatically continuing the movement of said lever, and hydraulic control means operatively connected to said lever for determining the rate of movement thereof.

2. In a machine tool having a servo-motor control mechanism for actuating a part of said machine and including a servo control valve, the combination with a rotatable cam for actuating said servo valve, of resiliently operable means for rotating said cam, manually operable means for releasing said resiliently operable means to cause actuation of said cam, and a dash pot mechanism operatively connected for controlling the rate of rotation of said cam.

3. An attachment for a machine tool for causing power actuation of an otherwise manually movable control lever, comprising a bracket attachable to the machine and having a spring loaded member connected in eccentric relation to said lever whereby upon rotation of said lever into a position to render said member effective, the member will continue the movement of the lever, a dash pot cylinder pivotally mounted on the machine for rotation about an axis parallel to the axis of rotation of the lever, a piston in said cylinder, and means operatively connecting said piston to the lever for governing the rate of movement thereof.

4. In a machine tool, the combination with a manually operable control lever, and means responsive to movement thereof for causing actuation of a movable part of the machine, said lever being movable through an arc of less than 90° for effecting a complete movement in one direction of said part, of means for causing power operation of said lever including a preloaded power device operatively connected to said lever for causing movement thereof in one direction through said arc, and additional means for retarding and controlling the rate of lever movement.

5. An attachment for a machine tool for automatically controlling movement of an otherwise manually movable control lever, comprising a bracket attachable to the machine, a spring loaded member carried by the bracket and detachably connected to the lever eccentric to its axis of rotation, whereby upon movement of the lever a predetermined amount the spring loaded member will be released and continue the movement of the lever, a cylinder pivotally mounted on the machine and having a contained piston, a piston rod operatively connecting the piston to the lever, channel means interconnecting opposite ends of the cylinder, said cylinder and channel means being filled with fluid, and an adjustable control valve in one end of the cylinder for controlling the escape of fluid into said channel means during movement of the piston to control the rate of movement imparted to the lever by said spring loaded member.

6. In a machine tool having a manually operable control lever movable in one direction to effect a relative feeding movement between a grinding wheel and a work piece, the combination of means for automatically continuing and controlling this direction of movement including a spring actuated member for moving the lever, independent means for determining the rate of said movement including a bracket having a cylinder formed therein, a piston slidably mounted in the cylinder and operatively connected to said lever, channel means interconnecting the ends of the cylinder, said cylinder and channel means being filled with fluid, an intermediate unrestricted connection between the cylinder and said channel means, whereby the piston will move at a rapid rate, a throttled connection at the end of the cylinder, whereby, after said piston has passed said intermediate connection, it will move at a slower rate corresponding to the time that the grinding wheel is in contact with the work.

7. In a machine tool having a manually operable control lever movable in one direction to effect a relative feeding movement between a grinding wheel and a work piece, the combination of means for automatically continuing and controlling this direction of movement, including a spring actuated member for moving the lever, means for determining the rate of said movement including a bracket having a cylinder formed therein attached to the machine, a piston slidably mounted in the cylinder and operatively connected to said lever, channel means interconnecting opposite ends of the cylinder, said cylinder and channel means being filled with fluid, an intermediate connection between the cylinder and said channel means, said connection being unrestricted whereby the piston will move at a rapid rate, a throttled connection at the end of the cylinder, whereby, after said piston has passed said intermediate connection, it will move at a slower rate corresponding to the time that the grinding wheel is in contact with the work; said lever being manually repositionable to return the parts to starting position.

8. In a grinding machine, the combination with a manual control lever which is adapted to be operatively connected for causing a relative infeeding movement between a grinding wheel and a work piece, of means for causing automatic actuation of said lever at variable rates corresponding to a cycle of rapid traverse advance, and feed, including a device which is automatically effective after a predetermined short movement of the lever to continue said movement, means to control the rate of said movement including a piston and cylinder, one of which is connected to the lever and the other fixed against movement, a first bypass channel from said cylinder which is unrestricted to permit rapid relative movement between the piston and cylinder, a second bypass channel from said cylinder having means to retard the relative movement between the piston and cylinder, and means effective at the end of the stroke to bypass said restricted channel.

9. In a machine tool having a control lever which is movable in opposite directions to control advance and retractive movements between a grinding wheel and a work support, the combination of means for automatically effecting and controlling one direction of said movement of the lever and thus of the parts controlled thereby including a power actuated member for effecting said movement, and independent rate control means adapted to yield a fast rate and a relatively slow rate, and means adjustable to vary said slow rate.

10. In a grinding machine having an actuator adapted to be connected for moving the grinding wheel, and a servo-motor mechanism for moving said actuator, including a servo-valve and a feed back connection to said valve from said actuator; the combination with a manual control lever operatively connected for moving said valve, of spring operated means for rotating said lever in a direction to cause an infeeding movement of said grinding wheel by said servo-motor mechanism, means to control the rate of said movement including a piston and cylinder, one of which is fixed, and the other connected to said lever, a first bypass connection from said cylinder to permit a relative fast movement of said lever; a second bypass connection having throttling means for causing a slow movement of said lever; and a third bypass connection adapted to be automatically opened to permit a second rapid movement after said servo-motor has completed its stroke to cause further opening of said servo-valve and thereby the creation of high pressure on said servo-motor to hold the grinding wheel in a fixed position while sparking out.

11. In a grinding machine having a manually operable control lever adapted to be connected for causing an infeeding movement between a grinding wheel and a work piece upon movement in one direction, the combination of means for automatically effecting said movement including a bracket, a pair of members mounted in said bracket, resiliently operable means for continuously urging said members in a separating direction, one of said members being eccentrically connected to said lever for causing rotation thereof, said lever having a circular boss thereon for engagement by said other member on the side of the center of rotation opposite to said eccentric connection for reducing the lateral forces on the lever during rotation thereof.

12. In a machine tool having a servo-motor control mechanism for shifting a grinding wheel relative to a work piece including a servo control valve, the combination of rotatable means for actuating said servo-valve, a power actuator for said rotatable means, a dash pot cylinder operatively connected for controlling the rate of said rotatable means including an adjustable throttle valve, a spring closed bypass valve in parallel with said throttle valve, and means to automatically open said last named valve when the grinding wheel has reached the end of its infeeding stroke to cause further opening of said servo-valve to hold the grinding wheel in a fixed position during finishing of the work to size.

13. In a machine tool having a manually operable control lever for effecting relative movement between a grinding wheel and a work piece, the combination of detachable means operatively connectible to said lever for effecting automatic movement thereof in one direction including resiliently operable means for effecting said movement, a piston and cylinder, a piston rod connected to said lever and having a lost motion connection to said piston, a series of apertures formed in said piston, means on the piston rod for closing said apertures during movement of the piston in one direction, bypass connections from said cylinder for controlling the rate of discharge therefrom during advance of said piston to thereby determine the rate of movement thereof, said lever being manually returnable to a starting position, said apertures automatically opening on the return movement to permit free bypass of fluid through the piston whereby the return movement may be effected at a rapid rate.

14. In a machine tool, the combination with a manually operable control lever and means responsive to movement thereof for causing actuation of a movable part of the machine, of means for causing power operation of said lever including a preloaded power device operatively connected to said lever for causing movement thereof in one direction, a first means adjustable to vary the preload, means for altering and controlling the rate of lever movement as effected by said power device, and adjustable means for determining the rate of movement for a preselected preload.

15. The combination with a machine tool including a pair of relatively movable supports, means for effecting relative movement of the supports, and a shiftable controller for determining the operative effect of said means, said controller including a manually actuable lever portion, of control means associated with said lever including a resilient actuator therefor, means operative by movement of the lever for determining the effective reaction of the actuator thereon, and means for controlling movement of the lever under influence of the actuator including a hydraulic dashpot mechanism coupled with the lever, said dashpot mechanism having portings interconnecting opposite sides thereof whereby manual movement of the lever may be effected substantially unrestricted by the dashpot, and means for automatically restricting said ports as the lever is shifted to render the actuator effective whereby the dashpot determines the rate of movement imparted to the lever by said actuator.

HANS ERNST.
RAYMOND D. WORTENDYKE.